United States Patent
Yamazaki

(12) 
(10) Patent No.: US 6,622,060 B1
(45) Date of Patent: Sep. 16, 2003

(54) APPARATUS FOR DISPLAYING MOUNTING STATE OF DEVICE

(75) Inventor: Naomi Yamazaki, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 213 days.

(21) Appl. No.: 09/619,340

(22) Filed: Jul. 19, 2000

(30) Foreign Application Priority Data

Jul. 23, 1999 (JP) .......................................... 11-209740

(51) Int. Cl.⁷ .............................................. G06F 19/00
(52) U.S. Cl. ........................... 700/121; 700/182; 716/9
(58) Field of Search ........................... 700/121, 56–59, 700/108, 182; 716/8–18; 702/33, 34, 81–84

(56) References Cited

U.S. PATENT DOCUMENTS

| | | | | |
|---|---|---|---|---|
| 5,050,091 A | * | 9/1991 | Rubin | 716/10 |
| 5,745,371 A | * | 4/1998 | Shouen | 716/15 |
| 5,889,677 A | * | 3/1999 | Yasuda et al. | 716/6 |
| 6,240,541 B1 | * | 5/2001 | Yasuda et al. | 716/6 |
| 6,259,963 B1 | * | 7/2001 | Naomachi | 700/121 |
| 6,289,254 B1 | * | 9/2001 | Shimizu et al. | 700/96 |
| 6,304,790 B1 | * | 10/2001 | Nakamura et al. | 700/97 |
| 6,330,705 B1 | * | 12/2001 | Matsushita et al. | 716/11 |

FOREIGN PATENT DOCUMENTS

| | | |
|---|---|---|
| JP | 06-332970 | 12/1994 |
| JP | 10-91668 | 4/1998 |

* cited by examiner

*Primary Examiner*—Leo Picard
*Assistant Examiner*—Zoila Cabrera
(74) *Attorney, Agent, or Firm*—Katten Muchin; Zavis Roseman

(57) ABSTRACT

The present invention relates to a mounting-state display apparatus for displaying the mounting-states of devices. Particularly, the present invention provides a mounting-state display apparatus enabled to automatically generate a display, indicating the mounting-states of various kinds of packages in the devices, which is not limited to a specific device, by using an NE-OPS for managing the devices. This mounting-state display apparatus comprises a device component database, for holding device components, which represents a mounting state of an arbitrary one of the devices as original picture elements of a minimum configuration required to indicate a mounting-state display and an application program portion for accessing the device component database and for generating a display indicating the mounting state of a specific one of the devices by performing operations of placing the original picture elements and changing the size thereof.

4 Claims, 13 Drawing Sheets

APPARATUS FOR DISPLAYING MOUNTING STATE OF DEVICE

BACKGROUND OF THE INVENTION

1. Field of the Invention

The present invention generally relates to a mounting-state display apparatus for displaying the mounting state of a device and, more particularly, to a mounting-state display apparatus for visually displaying a mounting state, in which various kinds of packages to be placed in a device are mounted thereon by using an NE-OPS (Network Element Operation System) for managing the device.

2. Description of the Related Art

Generally, an operator checks the mounting state of a transmission device and the presence or absence of an alarm by utilizing the display indicating function of an NE-OPS application program.

FIGS. 1 to 4 illustrate a process of generating a device status display image in a conventional mounting-state display apparatus for displaying the mounting states of devices.

FIG. 1 illustrates an example of the conventional mounting-state display apparatus adapted to display image display information corresponding to individual devices by combining such information to the NE-OPS application program body.

FIG. 2 illustrates the flow of an example of a display process to be performed by the apparatus of FIG. 1.

In FIG. 1, reference numeral 1 designates an example of a device to be displayed (hereunder referred to as a "display object device"), e.g., a transmission device, etc., in which various kinds of packages and components are disposed.

Reference numeral 2 denotes the conventional mounting-state display apparatus comprising the following portions. A device constitution information portion 21 stores screen layout information on a screen layout for displaying mounting-state information corresponding to each of specific display object devices. The screen layout information includes information on the configuration and arrangement of units, packages, and lamps, and so forth, which are fixedly assigned and correspond to each of the display object devices. The information on the configuration and arrangement is generated by a programmer (namely, manually generated) correspondingly to each of the display object devices.

An application program portion 22 stores the source code of the program body of the NE-OPS application program to be executed for performing the setting, maintenance, and operation of the display object devices. The compilation/linkage portion 23 compiles and links the screen layout information of the display object device 1 and the source code of the NE-OPS application program to thereby generate an executable NE-OPS application program for the display object device 1 and a device constitution display linked thereto.

A storage/control portion 24 stores the generated NE-OPS application program and the generated device constitution display. Further, the storage/control portion 24 communicates with the display object device 1 to thereby obtain from the device 1 device constitution information on the presence or absence of a package mounted thereon, so that the obtained device constitution information is reflected in the generated NE-OPS application program and the device constitution display. A display portion 25 displays the device constitution display represented by information, which is provided from the storage/control portion 24, on the screen thereof. Incidentally, various operations, such as the communication operation and the information obtaining operation, of the storage/control portion 24 are controlled by the NE-OPS application program. The same holds for examples that will be described below.

FIG. 2 illustrates the flow of an example of a process of displaying the device constitution display.

At steps S201 and S202, an operator selects one of plural NE-OPS application programs, which corresponds to a specific display object device 1, and screen layout information corresponding thereto, and then activates the selected NE-OPS application program. The storage/control portion 24 reads device constitution information from the specific display object device 1 and then correlates the read device constitution information to the screen layout information (at steps S203 and S204). Subsequently, at step S205, the display portion 25 displays the device constitution display, which corresponds to the display object device, on the screen thereof.

FIG. 3 illustrates the constitution of an example of the conventional mounting-state display apparatus, in which image display information on each of the devices is held in a database, and in which the information is displayed by executing the NE-OPS application program through the database.

Incidentally, in the drawings to be referred to in the description of this example and in the following description, like reference numerals designate like portions of the example of FIG. 1.

As shown in FIG. 3, the screen layout information corresponding to each of the display object devices 1 held in the device constitution information portion 21 is stored in the storage/control portion 24 as database information. Incidentally, the screen layout information itself is generated by an operator (namely, manually generated) even in this example, similar to the previously described example. The compilation/linkage portion 23 compiles the source code, which is read from the application program 22, of the NE-OPS application program, which has a common managing function among the devices, and links the compiled source code to the database. The storage/control portion 24 reads the device constitution information from the display object device 1 and links the read device constitution information to the screen layout information stored in the database. The display portion 25 displays the device constitution display represented by information, which is obtained by accessing the database provided in the storage/control portion 24, on the screen thereof.

FIG. 4 illustrates the flow of an example of a process of displaying the device constitution display of FIG. 3.

In the case of the example of FIG. 4, the order of the selection of one of the application programs and the activation of the selected application program is reversed (see steps S401 and S402). That is, in the case of this example, first, the NE-OPS application program, whose managing function is performed on the devices in common thereamong, is activated. Subsequently, an operator selects the screen layout information corresponding to a specific display object device 1 from pieces of screen layout information, which respectively correspond to a plurality of the devices and are registered in the database of the storage/control portion 24. Operations following this are similar to the corresponding operations illustrated in FIG. 2. That is, the storage/control portion 24 reads device constitution information from the specific display object device 1 and then correlates the read device constitution information to the screen layout information and, subsequently, the display portion 25 displays the device constitution display, which corresponds to the selected display object device, on the screen thereof (steps S403 to S405).

As described above, in the case of the example illustrated in FIGS. 1 and 2, a combination of the screen layout information corresponding to each of the devices and the NE-OPS application program corresponding thereto is compiled and linked. Further, in the example illustrated in FIGS. 3 and 4, the database to be accessed is switched among a plurality of databases, each of which is constituted by the device constitution information corresponding to a corresponding one of the display object devices, by using the NE-OPS application program, whose managing function is performed in common thereamong. Alternatively, the information stored in the database corresponding to each of the devices is replaced with another piece of information corresponding thereto by using such an NE-OPS application program.

The mounting state of a device varies with the kind of the device. That is, the mounting position of each of units, blocks, and packages to be mounted on the device varies with the kind of the device. Thus, in the case of the former example, when the kind of the device to be managed is changed, there is the need for preparing a newly compiled NE-OPS application program. Furthermore, in the case of the latter example in which the same device managing method is used among the devices, although a most part of the NE-OPS application program can be used in common thereamong, there is the necessity for changing the displaying function of the NE-OPS application program to manage the individual devices, whose mounting states differ from one another, and the database to be prepared corresponding to each of the devices.

Therefore, in each of the cases of the examples, a mounting-state display of a device should be prepared correspondingly to each of the devices. Thus, the conventional mounting-state display apparatus has a drawback in that a very large number of man-hours are needed for generating a device constitution display corresponding to each of the devices. Moreover, recently, there has been developed a device adapted so that units, blocks, and the like can be freely mounted in a rack thereof. In the case of using such devices, the aforementioned conventional mounting-state display apparatus has another drawback in that the mounting positions of the units, blocks, and the like cannot be specified in a rack of each of such devices, and that the conventional apparatus cannot deal with such devices.

SUMMARY OF THE INVENTION

Accordingly, in view of the aforementioned drawbacks of the conventional apparatus, an object of the present invention is to provide a mounting-state display apparatus, for displaying the mounting-states of devices, which is adapted to prepare each of the constituent elements of the devices as components (or pixels) thereof represented by data, which can be accessed by a NE-OPS application program, to then read constitution information and component information from each of the devices, to subsequently construct a display needed by the NE-OPS application program by using the components according to the read information, and to then indicate the necessary display on the screen of an external display device.

In this way, the mounting-state display apparatus preliminarily has display information on each of the units, blocks, packages, and the like needed for configuring devices, consequently, a display representing the mounting state of each of the devices can be automatically constructed by the application program using constitution information read from each of the devices when the devices are managed. This eliminates the necessity for preparing display information corresponding to each of the devices, differently from the conventional apparatus adapted to prepare such display information.

Moreover, it is unnecessary for the apparatus of the present invention to generate a constitution display corresponding to each of the devices. Thus, the number of man-hours and the development time, which are necessary therefor, can be reduced. Furthermore, the employment of specifications common to a plurality of devices allows the application program to simultaneously manage the plurality of devices without discrimination among the kinds of the devices.

To achieve the foregoing object, according to the present invention, there is provided a mounting-state display apparatus, for displaying the mounting-states of devices, which comprises a device component database for holding device components, which represent a mounting state of each of the devices, as original picture elements of a minimum configuration required to indicate a mounting-state display, and an application program portion for accessing the device component database, and for generating a display indicating a mounting state of a specific one of the devices by performing operations of placing the original picture elements and changing the size thereof.

In an embodiment of this apparatus, the application program portion is adapted to receive device constitution information from a device having a mounting state to be displayed when accessing the device component database, and to read original picture elements from the database according to the device constitution information. Further, in this embodiment, the device constitution information may include placement starting point information of the original picture elements for the operation of placing the original picture elements and size information of the original picture elements for the operation of changing the size thereof with reference to the placement starting point.

In this embodiment, the device component database may hold original picture elements classified into classes according to the internal placement configuration of the device components. Moreover, the device component database may have a header portion, which corresponds to each of the classes and describes position information and size information of the original picture elements of each of the classes.

In this embodiment, the application program portion is adapted to draw the original picture elements on an image display layer corresponding to each of the classes after the operations of placing and changing the size thereof. Further, the original picture elements, which are drawn on the image display layer provided on a front-surface side, may be preferentially displayed by superimposing images among the layers. In this embodiment, the classes may include classes of units, blocks, and packages, and correspond to a rear-surface unit image display layer, an intermediate block image display layer, and a front-surface package image display layer, respectively.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which.

DETAILED DESCRIPTION OF THE PREFERRED EMBODIMENTS

Figure 5:
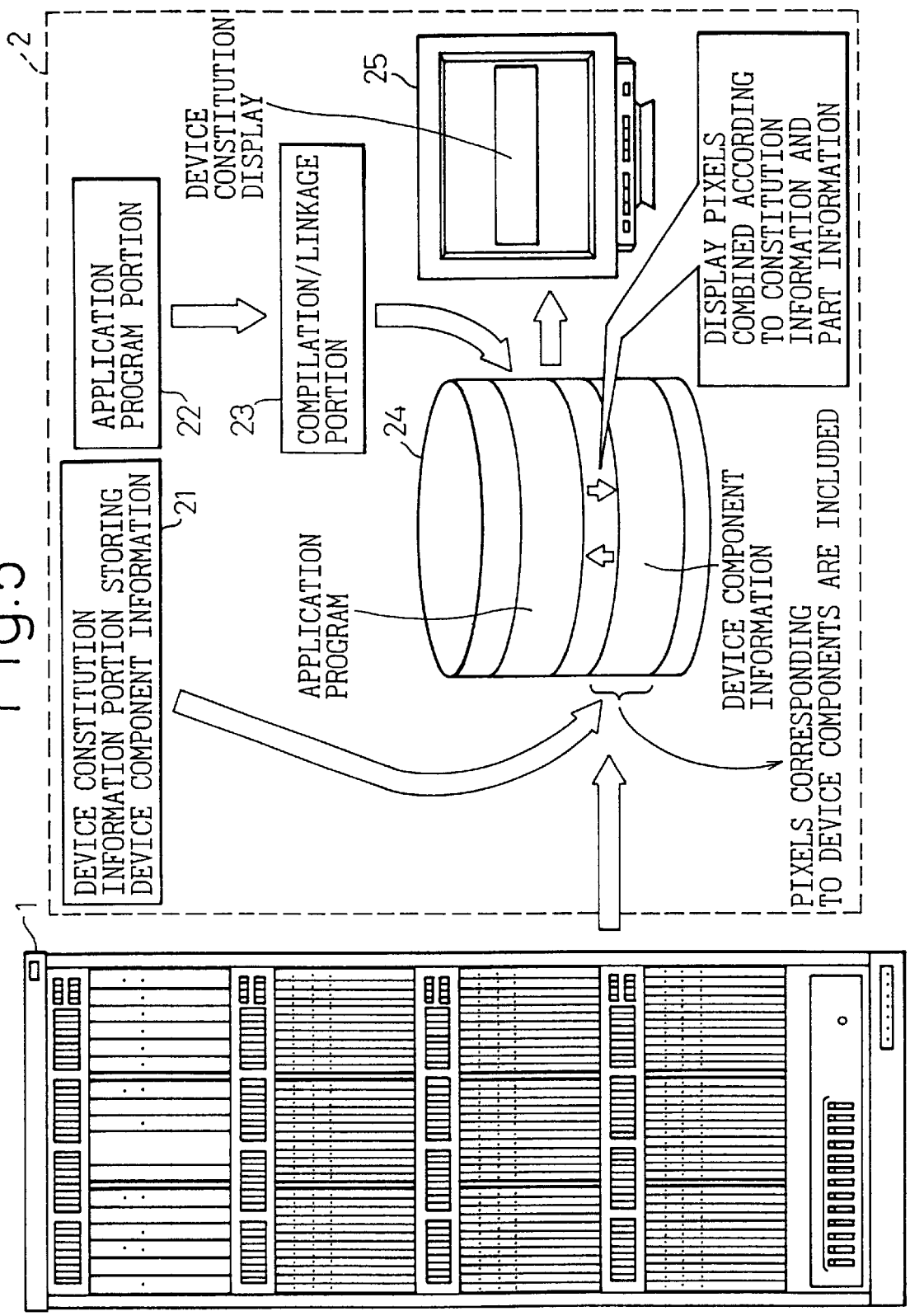
FIG. 5 is a diagram illustrating the fundamental constitution of a mounting-state display apparatus for displaying the mounting-states of devices according to the present invention.
Figure 6:
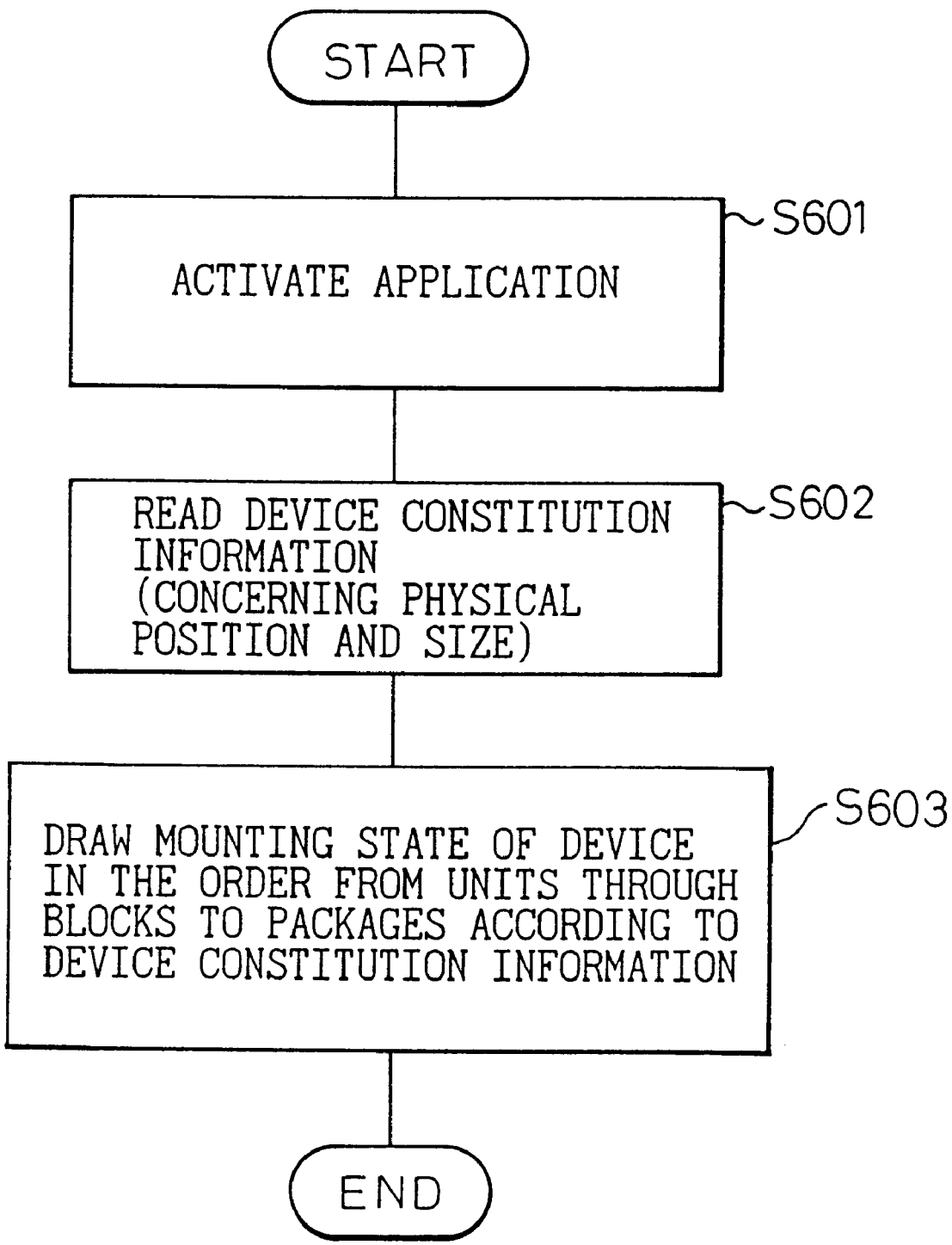
FIG. 6 is a flowchart illustrating an example of a process of displaying the device constitution display in the apparatus of FIG. 5.

FIG. 5 is a diagram illustrating the fundamental constitution of a mounting-state display apparatus for displaying the mounting-states of devices according to the present invention. FIG. 6 is a flowchart illustrating an example of a process of displaying the device constitution display in the apparatus of FIG. 5.

As shown in FIG. 5, this mounting-state display apparatus 2 consists of constituent portions described hereinbelow. In this mounting-state display apparatus 2, information on device components (corresponding to original picture elements) is stored in a database in a storage/control portion 24.

An application program portion 22 contains a source code of the program body of a NE-OPS application program, whose managing function is used in common among operations of managing the devices. A compilation/linkage portion 23 is operative to compile such a NE-OPS application program, and to link the compiled application program to a database application program for handling the device components.

The storage/control portion 24 stores the compiled NE-OPS application program and device component database source data. Further, the storage/control portion 24 receives part information according to the present invention in addition to conventional device constitution information. Moreover, the portion 24 correlates the received information to the device component information (corresponding to the original picture elements) stored in the device component database. Consequently, the portion 24 generates a device constitution display corresponding to a display object device, which is not limited to a specific device. A display portion 25 displays the device constitution display, which is generated by the storage/control portion 24, on the screen of a display device. Incidentally, there is the need for constructing the display object unit 1 in such a manner as to be able to provide the part information so as to realize the present invention.

FIG. 6 is a flowchart illustrating an example of the process of displaying the device constitution display in the apparatus of FIG. 5.

Figure 2:
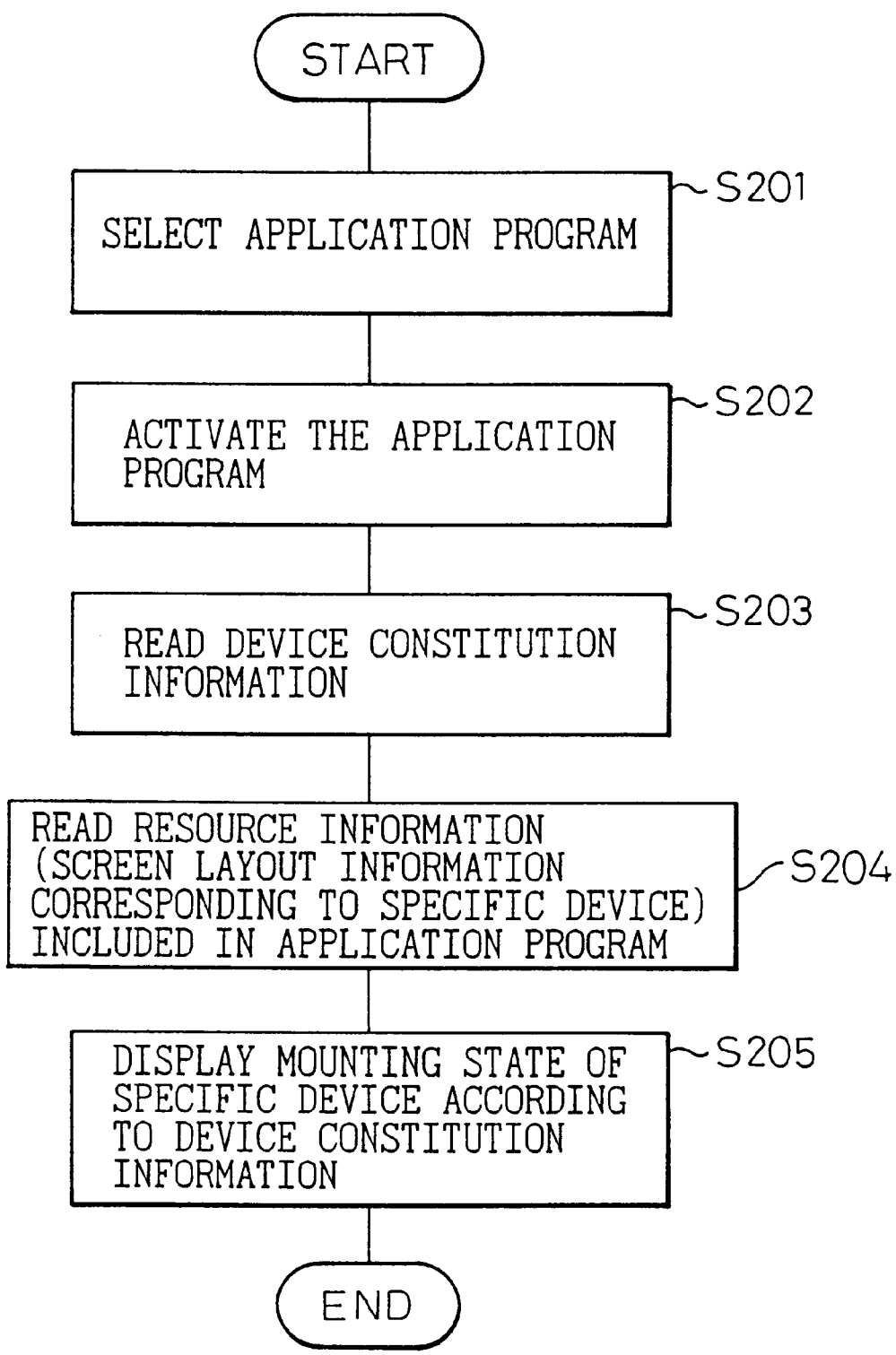
FIG. 2 is a flowchart illustrating an example of a process of displaying the device constitution display in the apparatus of FIG. 1.
Figure 3:
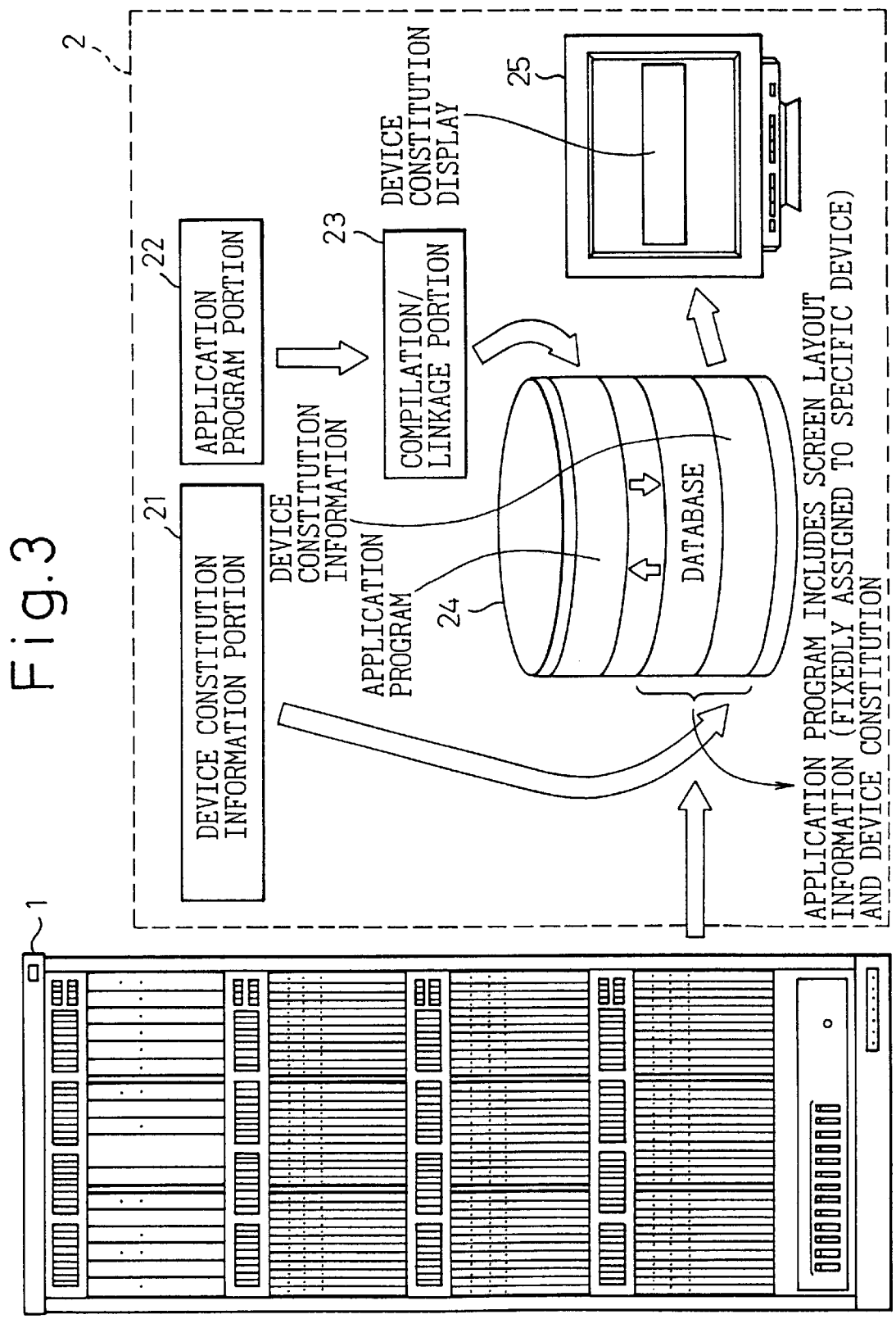
FIG. 3 is a diagram illustrating an example (2) of the conventional mounting-state display apparatus for displaying the mounting-states of devices.
Figure 4:
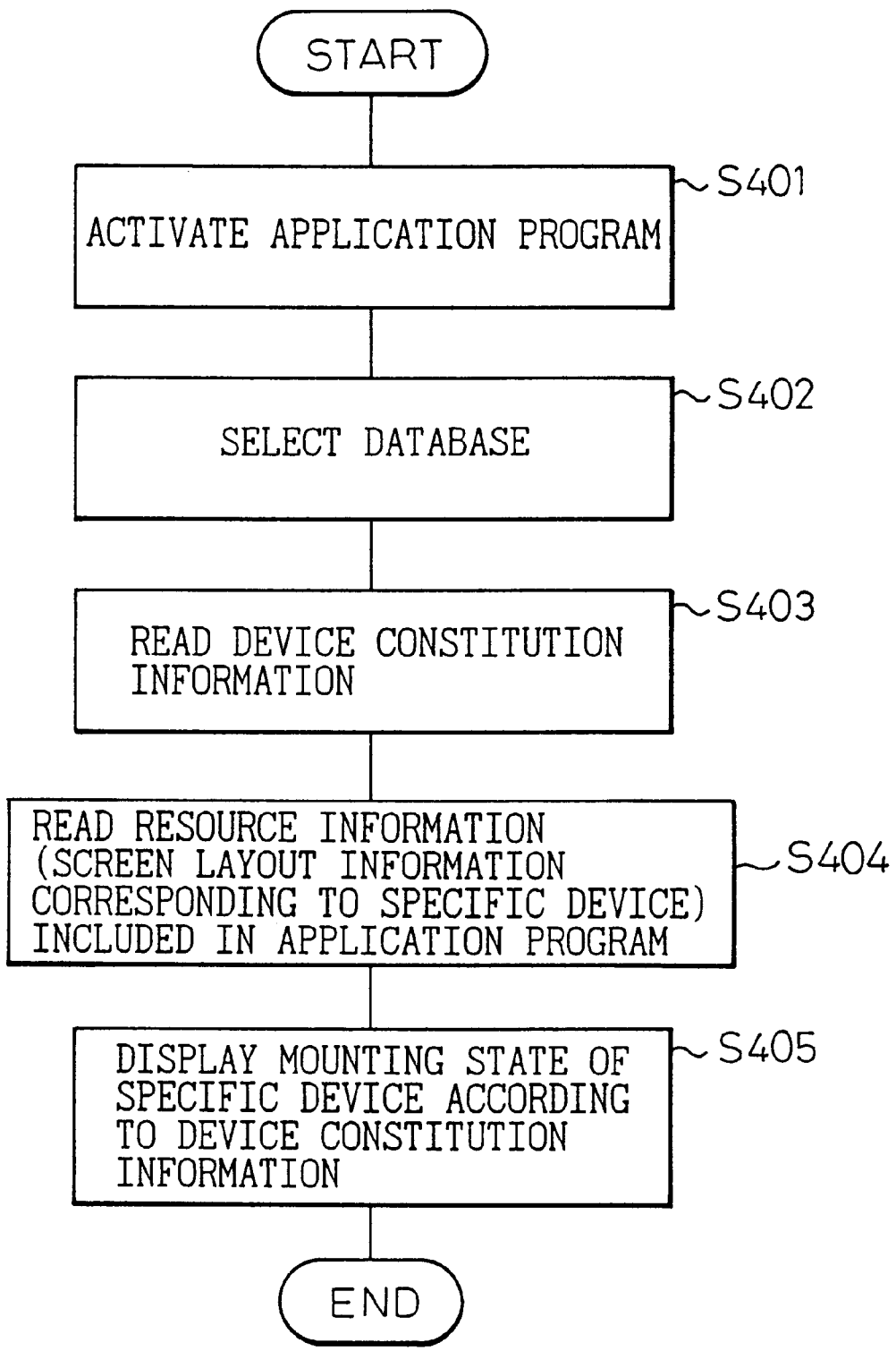
FIG. 4 is a flowchart illustrating an example of a process of displaying the device constitution display in the apparatus of FIG. 3.

As shown in FIG. 6, in the case of this process, the selection of the application program to be illustrated (at steps S201 and S402) in FIGS. 2 and 4 is unnecessary. This is because of the facts that the NE-OPS application program automatically generates a device constitution display corresponding to the display object device 1 according to the device constitution information and the part information received from the device 1 and that, thus, an operator does not need to select the device constitution display, corresponding to each of the devices, which would be selected by an operator correspondingly to each of the devices in the case of using the conventional apparatus.

In the case of the apparatus of the present invention, first, the NE-OPS application program, whose managing function is performed in common among operations to be performed on the devices, is activated. Then, the storage/control portion 24 reads the device constitution information and the part information from the display object device 1 (at steps S601 and S602). The storage/control portion 24 draws a display indicating the mounting state of the device 1 in the order, for example, from units through blocks and packages to parts according to the read device constitution information and the read part information. Finally, the portion 24 generates and completes the device constitution display corresponding to the device 1 (at step S603).

FIGS. 7 to 11 illustrate an embodiment of the mounting-state display apparatus of the present invention for displaying the mounting state of devices.

Figure 7:
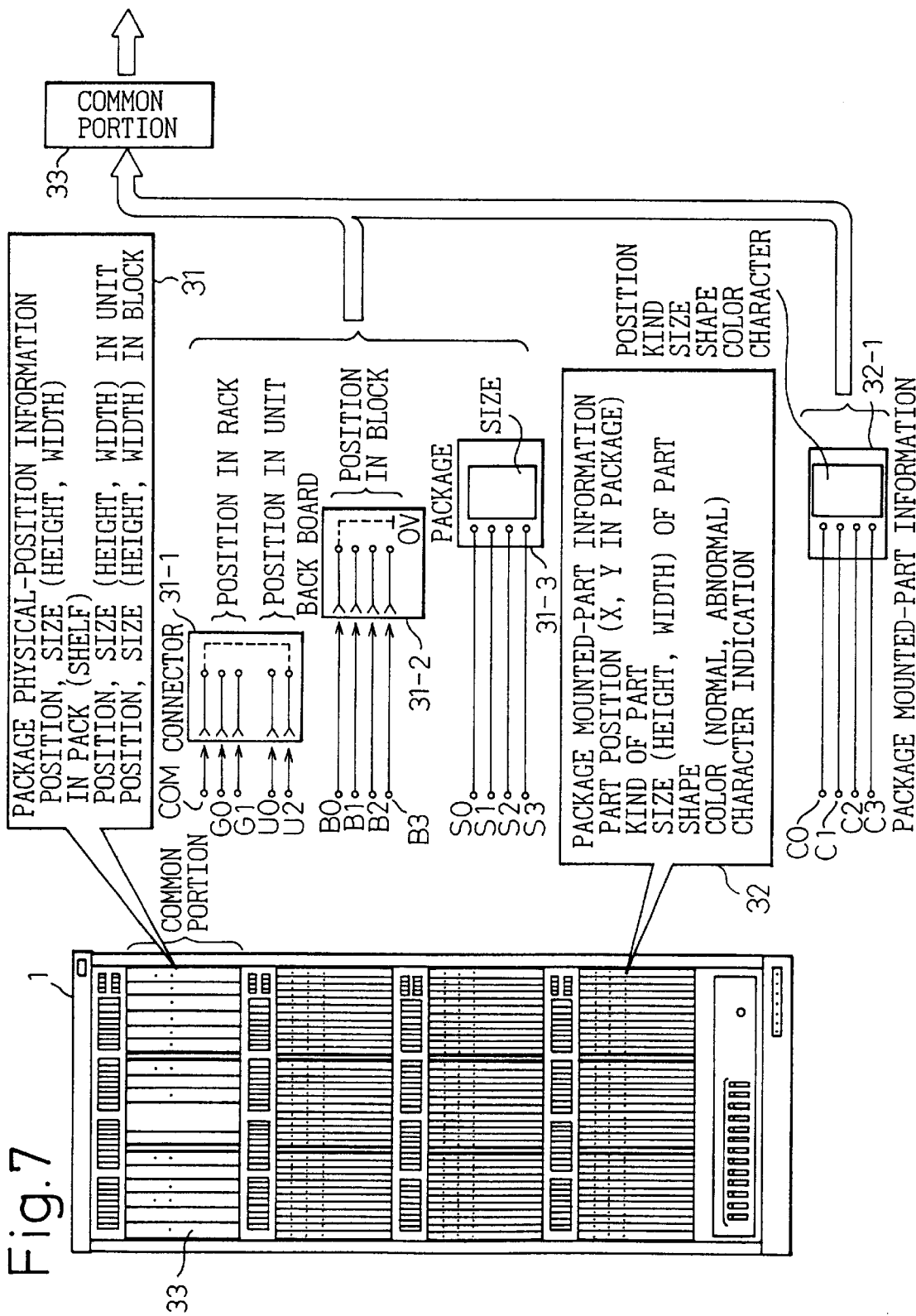
FIG. 7 is a diagram illustrating an example of each of device constitution information and part information received from a display object device.

FIG. 7 illustrates an example of each of device constitution information and part information received from the display object device 1.

This figure shows an example of package physical-position information 31 and package mounted-part information 32. The package physical-position information 31 includes information on a position in a rack and a position in a unit (31-1), information on a position in a block (31-2), and package information (31-3).

In the case of the information on a position in a rack and a position in a unit (31-1), 1 bit COM designates a common portion 33 as a destination of the information. Further, 2 bits G0 and G1 designate the position of one unit of the display object device 1 consisting of four units. Moreover, 2 bits U0 and U1 designate one of four blocks into which each of the units is divided. In the case of the information on a position in a block (31-2), four bits B0 to B3 designate the position of a package in a block. Furthermore, in the case of the package information (31-3), four bits S0 to S3 designate the pitch width of a package.

Figure 10:
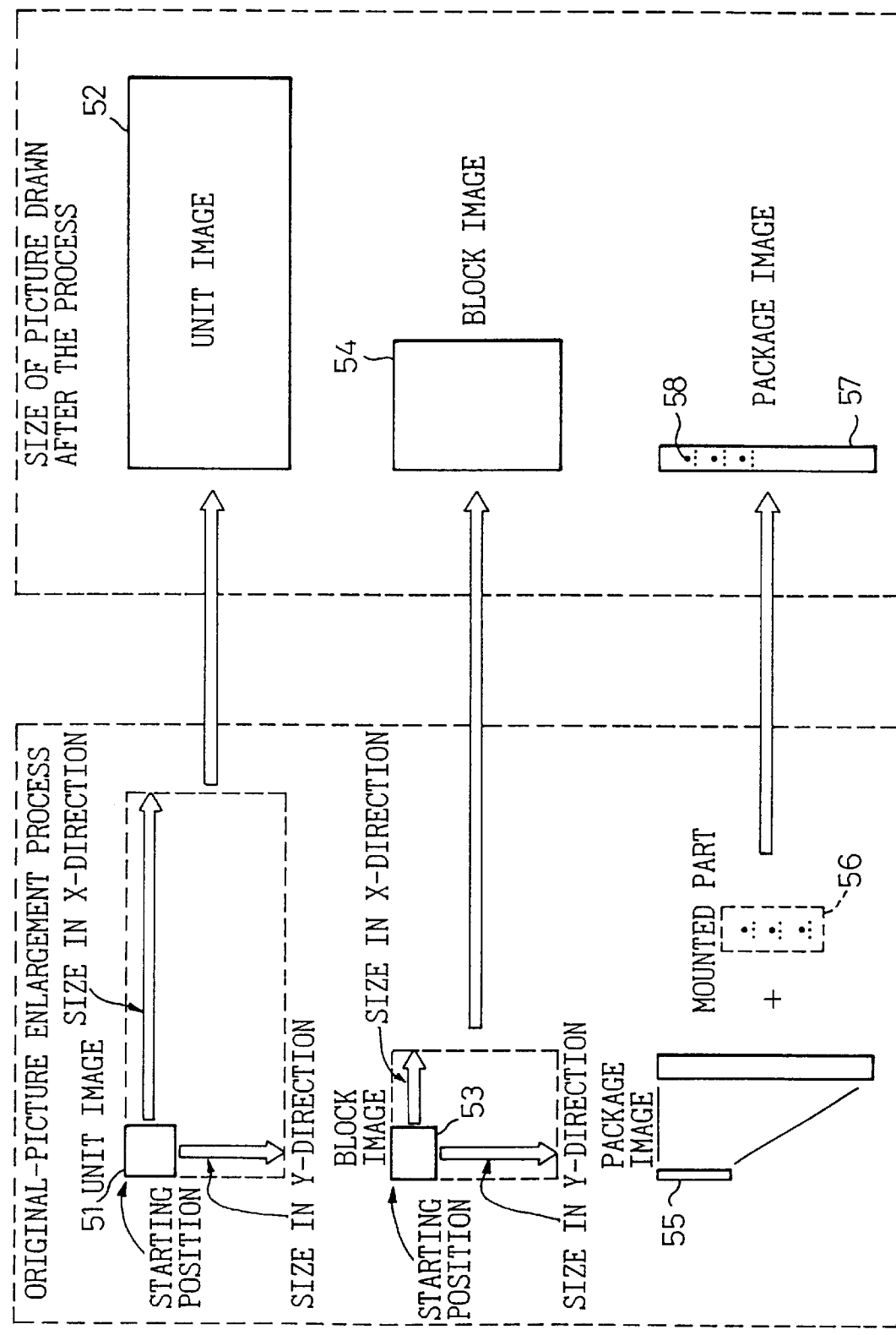
FIG. 10 is a diagram illustrating an example of an enlargement/pasting process to be performed on original picture elements.
Figure 11:
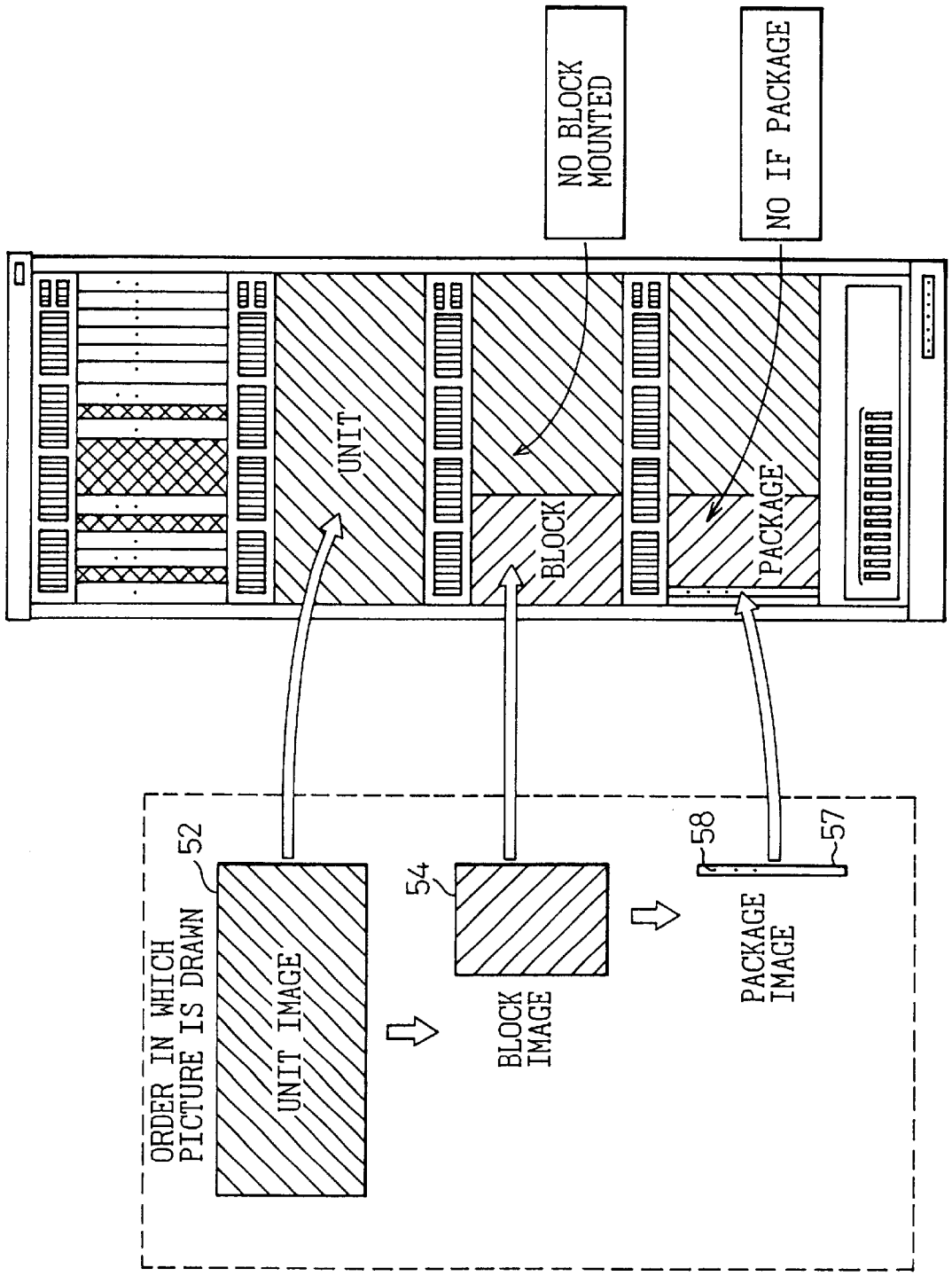
FIG. 11 is a diagram illustrating an example of the order in which generated device component images are drawn.

Further, the package mounted-part information 32 includes information on various kinds of parts to be mounted on a front side of a package (that is, information on the position, kind, size, shape, and color of each of the parts and character indications corresponding thereto). In the case of an example of the package mounted-part information (32-1), four bits C0 to C3 designate the position, kind, size, color, and character thereof correspondingly to each of these bits. Incidentally, the number of bits designating the position thereof, and the data designated by each of the bits are not limited to those in the case of this example. Furthermore, the mutual positional relation among the units, blocks, packages, and parts is illustrated in FIGS. 10 and 11, which will be referred to later.

Figure 8:
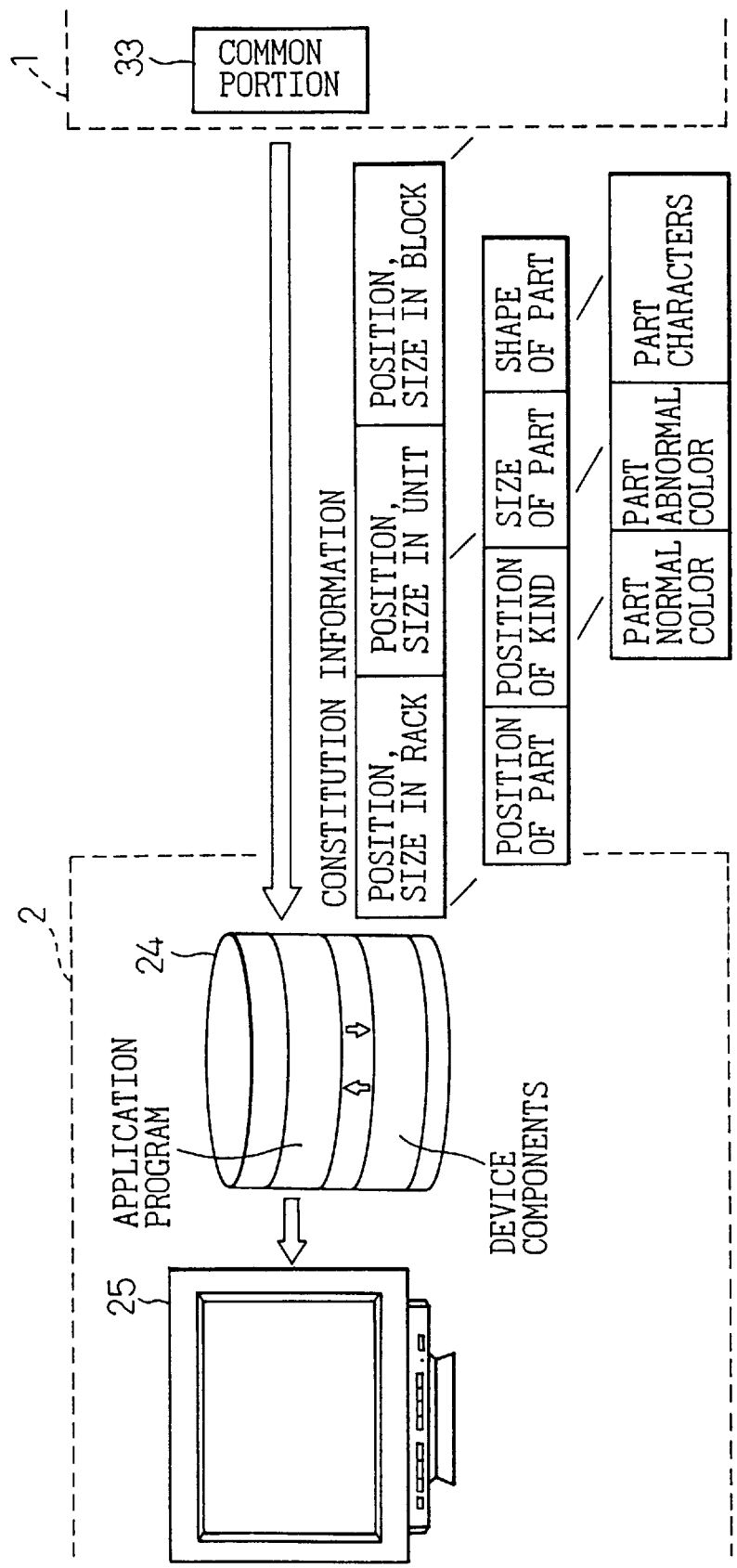
FIG. 8 is a diagram illustrating the constitution of an apparatus for displaying information received from a display object device.

FIG. 8 illustrates a process in which the storage/control portion 24 receives the package physical-position information 31 and the package mounted-part information 32 of FIG. 7 through the common portion 33 of the display object device 1 and in which the portion 24 then generates a device constitution display corresponding to the display object device 1 by using the device component database according to the received information, and causes the generated device constitution display on the screen of a display device of the display portion 25.

In the case of the example of FIG. 8, the storage/control portion 24 receives the package physical-position information 31 and the package mounted-part information 32 as serial data assembled into packets. Subsequently, the storage/control portion 24 reads the information on the device components (corresponding to the original picture elements) by accessing the device component database provided therein.

Figure 9:
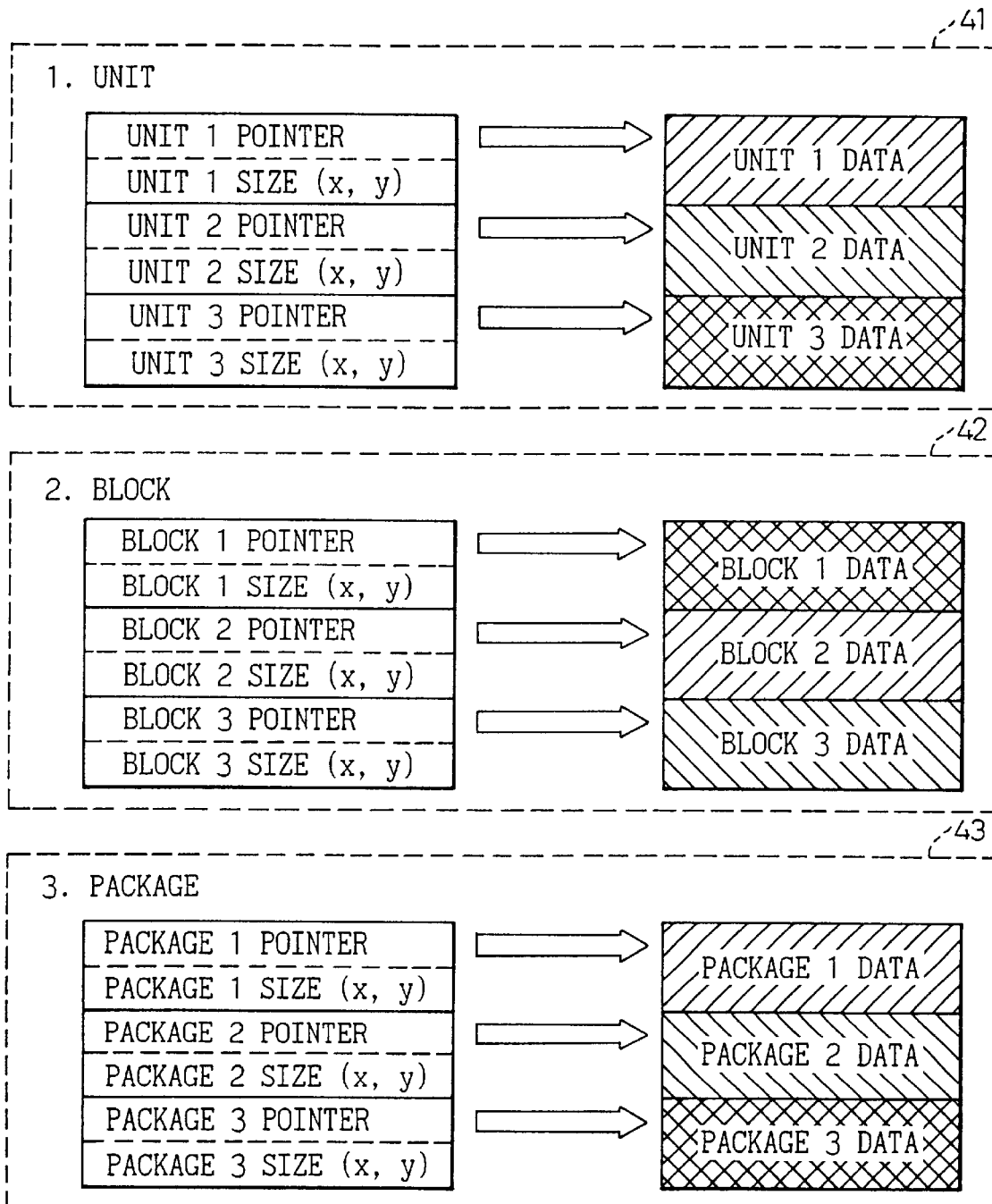
FIG. 9 is a diagram illustrating an example of placement configuration of device components, the information on which is stored in a device component database.

FIG. 9 illustrates an example of the placement configuration of device components, the information on which is stored in the device component database.

As shown in FIG. 9, the device component database is managed according to a unit original picture element pointer 41, a block original picture element pointer 42, and a package original picture element pointer 43 so as to enable the accessing thereto according to the package physical-position information 31 and the package mounted-part information 32. Incidentally, the "original picture element" is defined as display data (corresponding to a pixel) generated by a minimum configuration, which is necessary for displaying thereof on the screen of a display device. Vector data is used as such display data.

More specifically, pointer information indicating a starting position of an original picture, and size information indicating the sizes respectively corresponding to the longitudinal and transversal directions of the original picture are described in a header portion of UNIT (that is the name of a variable or a structure, an external reference to which is possible). Thus, information indicating the leading position of a data area, and information representing the size of the data can be read from the application program. Incidentally, the pointer information may be information representing the name of an image file. When selecting a necessary original picture from the leading part of the header portion, the application program reads nth pointer information and nth original picture pattern from the header portion of UNIT in the case that the pattern number of a necessary original picture pattern is "n". Then, the program sets data representing a pattern of x dots wide by y dots high, which are read from the starting position, as data representing the original picture pattern.

Incidentally, in the case that the pointer information indicates the name of an image file, image data having the name is read from the application program as data representing the original picture. Simultaneously, image data corresponding to constitution information on a rack frame, an EFTU portion, and a FAN portion is similarly read pattern according to the information read from the display object device as data to be included in the original picture pattern. In the case of the example of FIG. 7, when a unit 1 is designated by the bits G0 and G1, a unit-1 pointer (indicated by "Unit 1 pointer") and the corresponding unit size (indicated by "Unit 1 Size (x, y)") are referred to in the unit original-picture-element pointer 41. Then, data of a size (namely, the number of bytes) indicated by the value "Unit 1 Size (x, y)" is read from a leading address of the unit-1 original-picture element data ("Unit 1 Data"), which is indicated by the value of the pointer "Unit 1 pointer".

FIG. 10 illustrates an example of an enlargement/pasting process to be performed on the original picture elements.

In the case of the example of FIG. 10, each of a unit original-picture element 51, a block original-picture element 53, a package original-picture element 55, and a mounted-part original-picture element 56 is a minimum data unit read from the device component database, as illustrated in FIG. 9. Further, the pasting start position of each of these elements in the device constitution display is determined according to the position data obtained from the display object device 1.

Furthermore, an enlargement process in the direction of each of X-axis and Y-axis is performed according to the obtained size data by using the starting position as a starting point (in the case of this example, the upper and left corner point of the original picture element). Thus, a unit image 52, a block image 54, and a package image 57 of the device constitution display are completed. In the case of the example of FIG. 7, the starting position is determined according to the obtained information (represented by G0, G1; L0, L1; B0 to B3) concerning the package image 57. The value of an enlargement ratio in the direction of each of X-axis and Y-axis is determined according to the obtained information (represented by S0 to S3). Incidentally, this figure illustrates the example in which a mounted-part image 58 is pasted to an upper layer of a layer for displaying the package image 57 so that an image of a package having parts mounted thereon is generated.

Thus, the original picture pattern read by the application program undergoes the process of enlargement in the transverse direction (X-direction) and in the longitudinal direction (Y-direction) to be performed according to the size information included in the constitution information read from the display object device 1. In the case of this example, the rank frame, the FFTU portion, and the FAN portion are drawn in addition to the pattern, the enlargement of which has been completed. Then, the original-picture pattern is drawn by calculating the starting position on condition that the inwardly upper and left corner point of the rack is designated as the starting point (x=0, and y=0).

FIG. 11 illustrates an example of the order in which generated device component images are drawn (or pasted).

The unit image 52, the block image 54, and the package image 57 with the mounted-part image 58 are respectively pasted to a unit display layer, a block display layer, and a package display layer in this order. Incidentally, in this case, an ordinary image superimposing process using a plurality of layers is employed. Therefore, a package image to be displayed on a front surface side is placed in such a manner as to be superimposed on an upper layer. As a result, parts, on which no blocks and no packages are mounted, are displayed in base colors (that is, units and blocks are filled in with the base colors). Thus, it is easy to discriminate a state in which no blocks and no packages are mounted.

Figure 12:
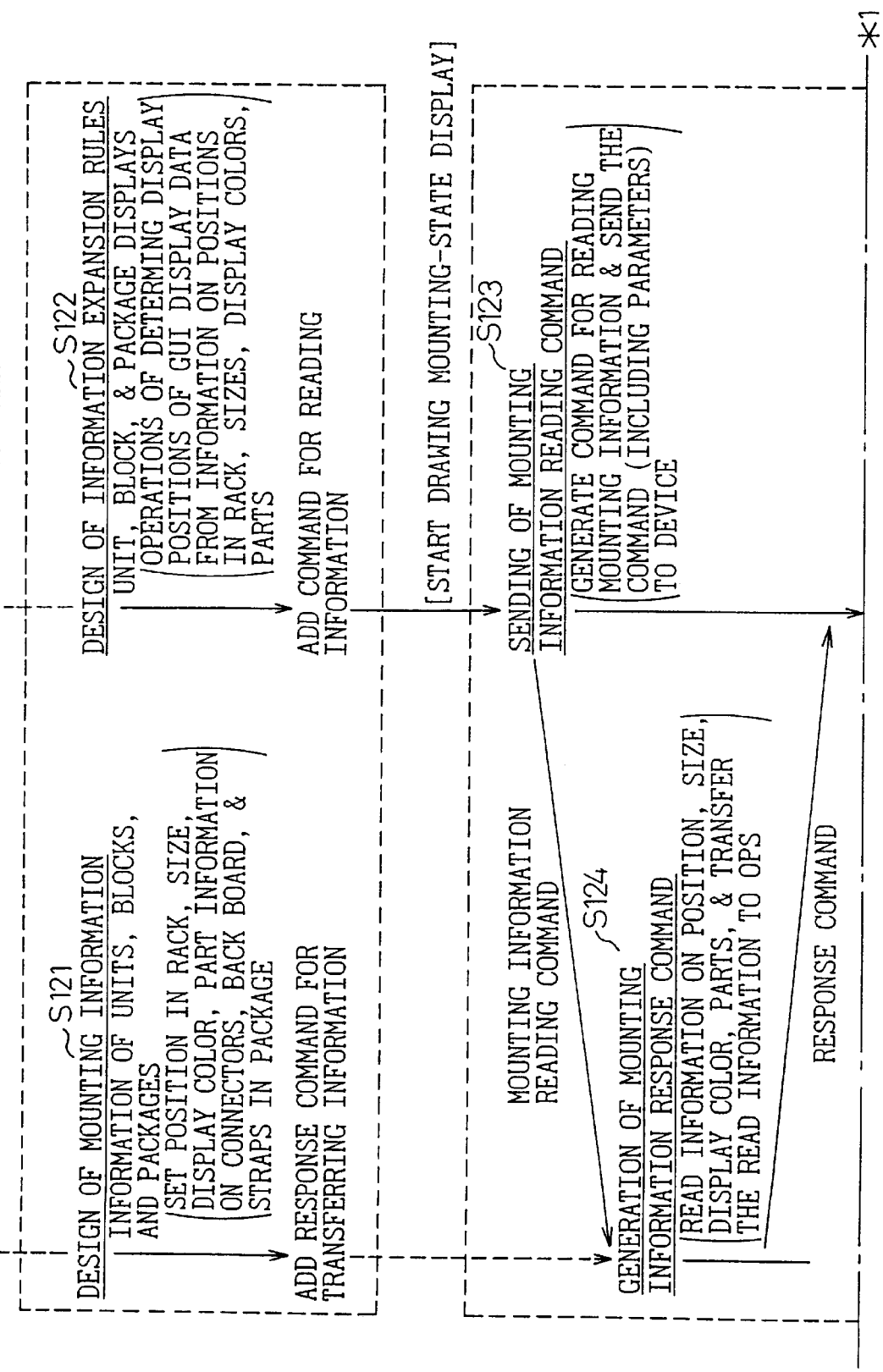
FIG. 12 is a diagram illustrating a part (1) of an example of a sequence of generation of a device constitution display for indicating a mounting states of a device.
Figure 13:
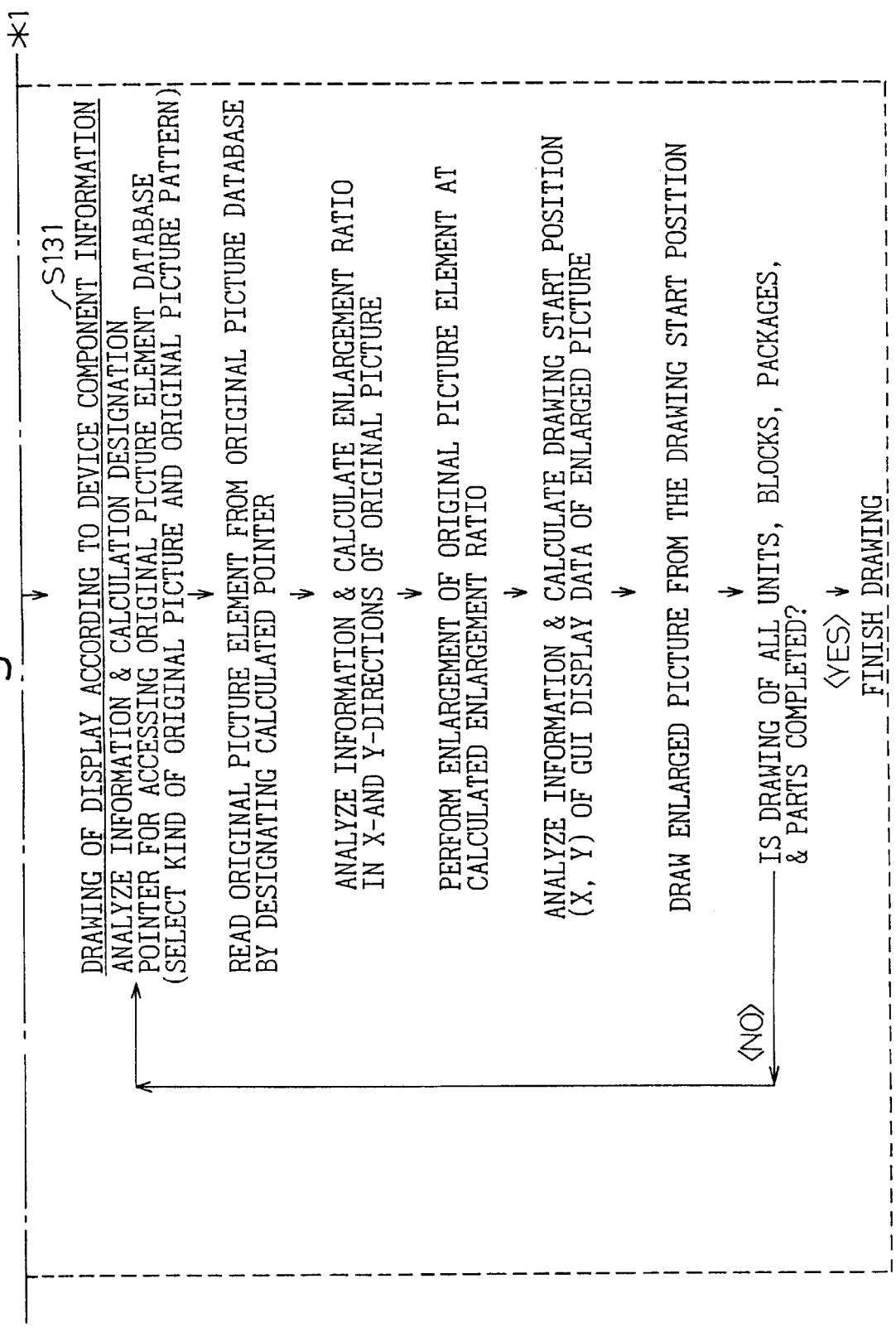
FIG. 13 is a diagram illustrating a part (2) of the example of the sequence of generation of the device constitution display for indicating the mounting states of the device.

FIGS. 12 and 13 are flowcharts outlining the aforementioned sequence of generation of a device constitution display for indicating the mounting state of a device.

As shown in FIG. 12, at step S121, information (or data) representing the device components, namely, units, blocks, and packages to be mounted on the device is generated by the device (NE). Such information includes information on connectors, back boards, sizes, and display colors (see FIG. 7). A device mounting information reading response command is added to the generated information so that the information of a predetermined format is transferred through the common portion 33 when a request is issued from the mounting state display apparatus 2 (see FIG. 8).

On the other hand, at step S122, the application program (OPS) preliminarily determines an arbitrary device constitution, as illustrated in FIGS. 10 and 11. Then, the application program expands the original picture elements, which are stored in the device component database, to units, blocks, and packages corresponding to a specific device according to information obtained from the device (NE) as illustrated in FIGS. 10 and 11. Further, the application program defines information expansion rules for obtaining GUI display data. Furthermore, the application program adds a device mounting information reading response command for obtaining such information.

Next, at step S123, the application program (OPS) sends the device mounting information reading response command including a predetermined parameter to the device (NE). All the device components mounted on the device (NE) can be designated by using the parameter. Further, the specific units or packages can be individually designated by using the parameter. Then, at step S124, a corresponding device mounting information reading response command is sent from the device (NE). This command includes information, which is generated by the device (NE) at step S121, on the device components (see FIGS. 7 and 8).

Figure 1:
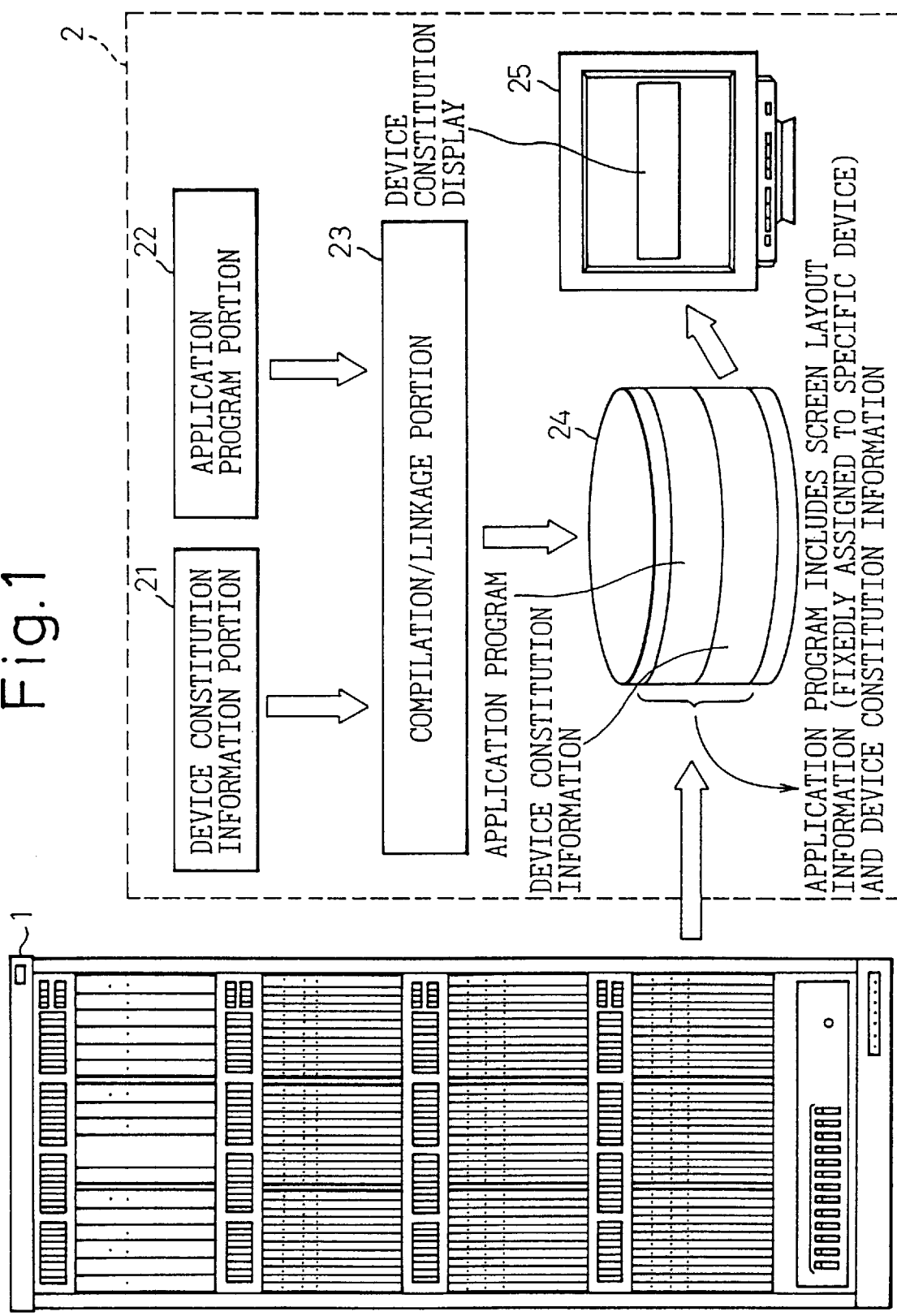
FIG. 1 is a diagram illustrating an example (1) of the conventional mounting-state display apparatus for displaying the mounting-states of devices.

Thereafter, at step S131, the obtained device component information is analyzed. Further, an original picture element corresponding to each of the device components is read by calculating a corresponding designation pointer value (see FIG. 9). Next, a device component display peculiar to each of the devices is generated from the original picture element according to the position of each of the placed device components and a corresponding enlargement ratio. Then, the generated device component display is pasted and superimposed onto a corresponding display layer (FIGS. 1 and 11).

As described above, according to the present invention, all the original picture elements of a minimum configuration needed for drawing the device constitution display are generated simultaneously with the generation of the application program. Then, when the application program designates a device, a corresponding one of the original picture elements is read and edited. Thus, the device component image corresponding to a specific device and the mounting-state display, which corresponds to the specific device and use such an image, are generated.

Therefore, the present invention eliminates the necessity for generating a mounting state display corresponding to each of devices, which is generated in each of the device in the case of the conventional apparatus. Thus, the number of man-hours for generating such a mounting state display in each of the devices is saved. Further, according to the present invention, there is no need for preparing a display corresponding to the device in the application program. Consequently, the simultaneous centralized management of a plurality of kinds of devices is realized. Furthermore, according to the present invention, the displaying of the mounting state of a device, in which units, blocks, and so forth can be freely mounted, can be easily achieved.

Although the preferred embodiments of the present invention have been described above, it should be understood that the present invention is not limited thereto and that other modifications will be apparent to those skilled in the art without departing from the sprint of the invention.

The scope of the present invention, therefore, should be determined solely by the appended claims.

What is claimed is:

1. A mounting state display apparatus for displaying mounting-states of devices, comprising:

a device component database, for holding device components, which represents a mounting state of each of said devices as original picture elements of a minimum configuration required to indicate a mounting state display; and an application program portion for accessing said device component database and for generating a display indicating a mounting state of a specific one of said devices by performing operations of placing said original picture elements and changing a size thereof;

wherein said application program portion is adapted to receive device constitution information from a device having a mounting state to be displayed when accessing said device component database and to read original picture elements from said database according to the device constitution information;

wherein the device constitution information includes placement starting point information of the original picture elements for the operation of placing the original picture elements and size information of the original picture elements for the operation of changing the size thereof with reference to the placement starting point; and wherein said application program portion is adapted to draw the original picture elements on an image display layer corresponding to each of one or more classes of apparatus after the operations of placing and changing the size thereof and wherein the original picture elements, which are drawn on the image display layer provided on a front-surface side, are preferentially displayed by superimposing,images along the layers.

2. The apparatus according to claim 1, wherein said device component database holds original picture elements classified into classes according to internal placement configuration of the device components.

3. The apparatus according to claim 2, wherein said device component database has a header portion which corresponds to each of the classes and describes position information and size information of the original picture elements of each of the classes.

4. The apparatus according to claim 1, wherein the classes include units, blocks, and packages and correspond to a rear-surface unit image display layer, and a front-surface package image display layer, respectively.

* * * * *